United States Patent
Colbert

(10) Patent No.: US 8,635,395 B2
(45) Date of Patent: Jan. 21, 2014

(54) METHOD OF SUSPENDING AND RESUMING VIRTUAL MACHINES

(75) Inventor: Osten Kit Colbert, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 909 days.

(21) Appl. No.: 12/559,489

(22) Filed: Sep. 14, 2009

(65) Prior Publication Data

US 2011/0066786 A1 Mar. 17, 2011

(51) Int. Cl.
  *G06F 12/00* (2006.01)
  *G06F 9/455* (2006.01)

(52) U.S. Cl.
  USPC .......................... 711/6; 711/E12.016; 718/1

(58) Field of Classification Search
  USPC .................................................. 711/6; 718/1
  See application file for complete search history.

(56) References Cited

U.S. PATENT DOCUMENTS

| | | | |
|---|---|---|---|
| 7,810,092 B1 * | 10/2010 | van Rietschote et al. | 718/1 |
| 2004/0010787 A1 * | 1/2004 | Traut et al. | 718/1 |
| 2005/0268298 A1 * | 12/2005 | Hunt et al. | 718/1 |
| 2007/0074199 A1 * | 3/2007 | Schoenberg | 717/168 |
| 2008/0163239 A1 * | 7/2008 | Sugumar et al. | 718/105 |
| 2008/0235482 A1 * | 9/2008 | Armstrong et al. | 711/173 |
| 2009/0125904 A1 * | 5/2009 | Nelson | 718/1 |
| 2010/0023942 A1 * | 1/2010 | Sheu et al. | 718/1 |
| 2010/0057881 A1 * | 3/2010 | Corry et al. | 709/216 |
| 2010/0070978 A1 * | 3/2010 | Chawla et al. | 718/105 |
| 2010/0250824 A1 * | 9/2010 | Belay | 711/6 |
| 2010/0299666 A1 * | 11/2010 | Agbaria et al. | 718/1 |
| 2011/0010515 A1 * | 1/2011 | Ranade | 711/162 |

* cited by examiner

*Primary Examiner* — Reginald Bragdon
*Assistant Examiner* — Aracelis Ruiz

(57) ABSTRACT

A virtual machine is suspended and quickly restarted while maintaining the VM's state. The method is quick enough so that network connections are maintained across the restart and the guest operating system and guest applications running in the VM are not aware of the restart. As a result, users and clients connected to the VM do not notice any downtime or disruption to the VM. After suspension and before the restart, VM configuration changes that would not be possible or be very difficult through code changes alone while the VM was running can be made.

20 Claims, 9 Drawing Sheets

METHOD OF SUSPENDING AND RESUMING VIRTUAL MACHINES

BACKGROUND

In virtualized computer systems, it may be desirable in certain circumstances to suspend a virtual machine (VM) and resume it at a later time. For example, changes to the VM's configuration file cannot be made while the VM is executing. In order to make such changes, the VM is first suspended. This causes the VM execution to halt and the VM's state to be serialized and written to a file, commonly known as a checkpoint file or a suspend file. After the VM is suspended, the desired change can be made to the VM's configuration file. The VM having the changed configuration can then be resumed from the saved state.

A problem with the approach described above is that it may take a very long time to write out the VM's state to a file and then read it back again. For a VM with a memory size of many gigabytes, this can take tens of seconds to potentially minutes. Because of this prolonged read and write cycle, the VM would incur downtime that would cause the VM's network connection to expire and close. In addition, users and clients of the VM would not be able to access or interact with the VM during this downtime. This would be viewed as an outage period for the VM.

An alternative approach has been developed to reduce the amount of downtime. In this alternative approach, a new copy of the VM is started on the same host as the old VM while the old VM is still running. It then "pre-copies" the VM's memory from the old VM to the new VM. This is followed by the steps of suspending the old VM, making any desired changes to the VM's configuration file, and resuming from the new VM. Because of the "pre-copying" step, the amount of downtime the VM encounters can be reduced quite a bit. The downside of this approach is the doubling of the VM's memory usage and CPU costs associated with the "pre-copying" step.

SUMMARY OF THE INVENTION

One or more embodiments of the invention provide a VM suspend/resume method that minimizes downtime of the VM while efficiently utilizing the CPU and memory resources provided by the VM's host computer system. With this method, the configuration state of a VM can be changed without any user-noticeable downtime or performance degradation.

A method of suspending and resuming according to an embodiment of the invention is carried out in a host computer having a first instance of a virtual machine running therein and includes the steps of instantiating a second instance of the virtual machine while guest instructions are being executed in the first instance of the virtual machine, suspending the execution of the guest instructions in the first instance of the virtual machine and storing a state of the first instance of the virtual machine, copying metadata maintained for pages of virtual memory space allocated for the first instance of the virtual machine and using the copied metadata as metadata for pages of virtual memory space allocated for the second instance of the virtual machine, loading the stored state into the second instance of the virtual machine, and resuming the execution of the guest instructions in the second instance of the virtual machine. In this method, the stored state does not include the virtual machine's memory. Instead of storing the virtual machine's memory and then restoring it, metadata maintained for pages of virtual memory space allocated for the first instance of the virtual machine, which include pointers to the virtual machine's memory, are copied and used as metadata for pages of virtual memory space allocated for the second instance of the virtual machine.

A method of reconfiguring a virtual machine according to an embodiment of the invention includes the steps of suspending a first virtual machine process in which a guest operating system and guest instructions are running, storing a state of devices emulated in the first virtual machine process, copying metadata maintained for pages of virtual memory space allocated for the first virtual machine process and using the copied metadata as metadata for pages of virtual memory space allocated for the second virtual machine process that is configured differently from the first virtual machine process, loading the stored state into corresponding devices emulated in the second virtual machine process, and executing the guest operating system and the guest instructions in the second virtual machine process. In this method, the stored state does not include the state of the virtual machine's memory. Instead of storing such state and then restoring it in the second virtual machine process, metadata maintained for pages of virtual memory space allocated for the first virtual machine process, which include pointers to the virtual machine's memory, are copied and used as metadata for pages of virtual memory space allocated for the second virtual machine process.

Other embodiments include, without limitation, a computer-readable storage medium that includes instructions that enable a processing unit to implement one or more aspects of the disclosed methods as well as a system configured to implement one or more aspects of the disclosed methods.

DETAILED DESCRIPTION

The suspend/resume method according to one or more embodiments of the invention is a method for suspending and quickly restarting a VM while maintaining the VM's state. The method is quick enough, generally in the range of couple of seconds or less, that network connections are maintained across the restart and the guest operating system and guest applications running in the VM are not aware of the restart. As a result, users and clients connected to the VM do not notice any downtime or disruption to the VM. After suspension and before the restart, VM configuration changes that would not be possible or be very difficult through code changes alone while the VM was running can be made.

Figure 1:
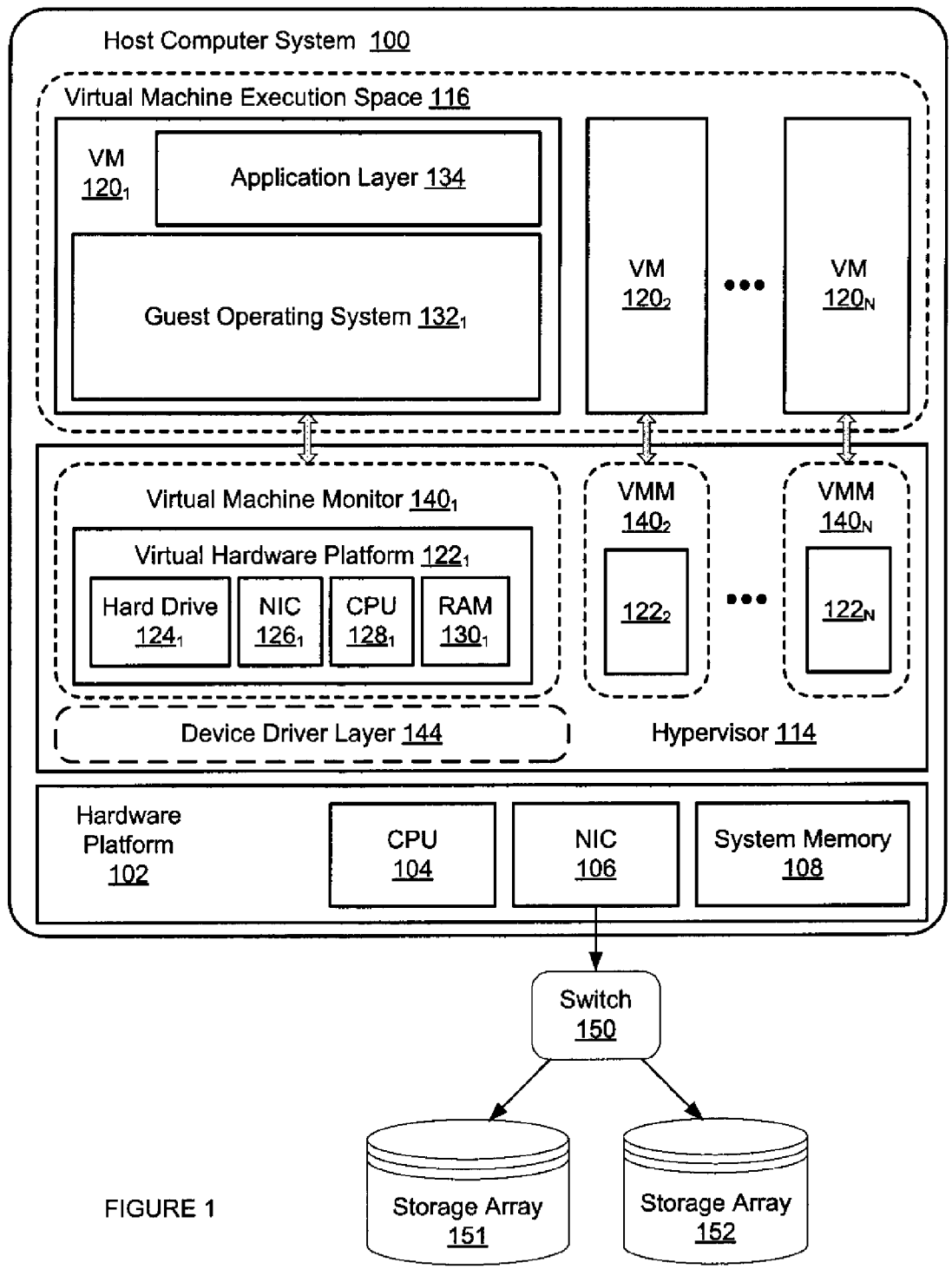
FIG. 1 depicts a block diagram of a virtualized computer system in which one or more embodiments of the invention may be practiced.

FIG. 1 depicts a block diagram of a virtualized computer system in which one or more embodiments of the invention may be practiced. Host computer system 100 may be constructed on a desktop, laptop or server grade hardware platform 102 such as an x86 architecture platform. The hardware platform includes a one or more CPUs 104, a network adapter (NIC 106), system memory 108, and other I/O devices such as, for example and without limitation, a mouse and keyboard (not shown in FIG. 1). Data storage for host computer 110 is served by a storage area network (SAN), which includes a storage array 151 (e.g., a disk array), a storage array 152 (e.g., a disk array), and a switch 150 that connects host computer system 100 to storage array 151 and storage array 152. Switch 150, illustrated in the embodiment of FIG. 1, is a SAN fabric switch, but other types of switches may be used. In addition, distributed storage systems other than SAN, e.g., network attached storage, may be used. Also, in some embodiments of the invention, local storage, such as a hard disk drive, may be used.

A virtualization software layer, also referred to hereinafter as hypervisor 114, is installed on top of hardware platform 102. Hypervisor 114 supports virtual machine execution space 116 within which multiple VM processes may be concurrently executed to instantiate VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware such as virtual hard drive $124_1$, virtual NIC $126_1$, virtual CPU $128_1$ and guest physical RAM $130_1$ for VM $120_1$. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system $132_1$ to execute any supported application in application layer 134 for VM $120_1$. Device driver layers in guest operating system $132_1$ of VM $120_1$ includes device drivers that interact with emulated devices in virtual hardware platform $122_1$ as if such emulated devices were the actual physical devices. Hypervisor 114 is responsible for taking requests from such device drivers and translating the requests into corresponding requests for real device drivers in device driver layer 144 of hypervisor 114. The device drivers in device driver layer 144 then communicate with real devices in hardware platform 102. In addition, for each of VMs $120_1$-$120_N$, hypervisor 114 allocates a virtual memory address space to the corresponding virtual machine process and maintains metadata about pages within this virtual memory address space. The metadata indicates whether a page within this virtual memory address space is mapped to a location in system memory 108, is shared with other virtual machine processes, has been swapped out to a swap device, has been ballooned (i.e., allocated for use by host computer system 100), etc.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

FIGS. 2, 3, 4 and 5 illustrate the methods of suspending and resuming and reconfiguring a virtual machine according to one or more embodiments of the invention.

Figure 2:
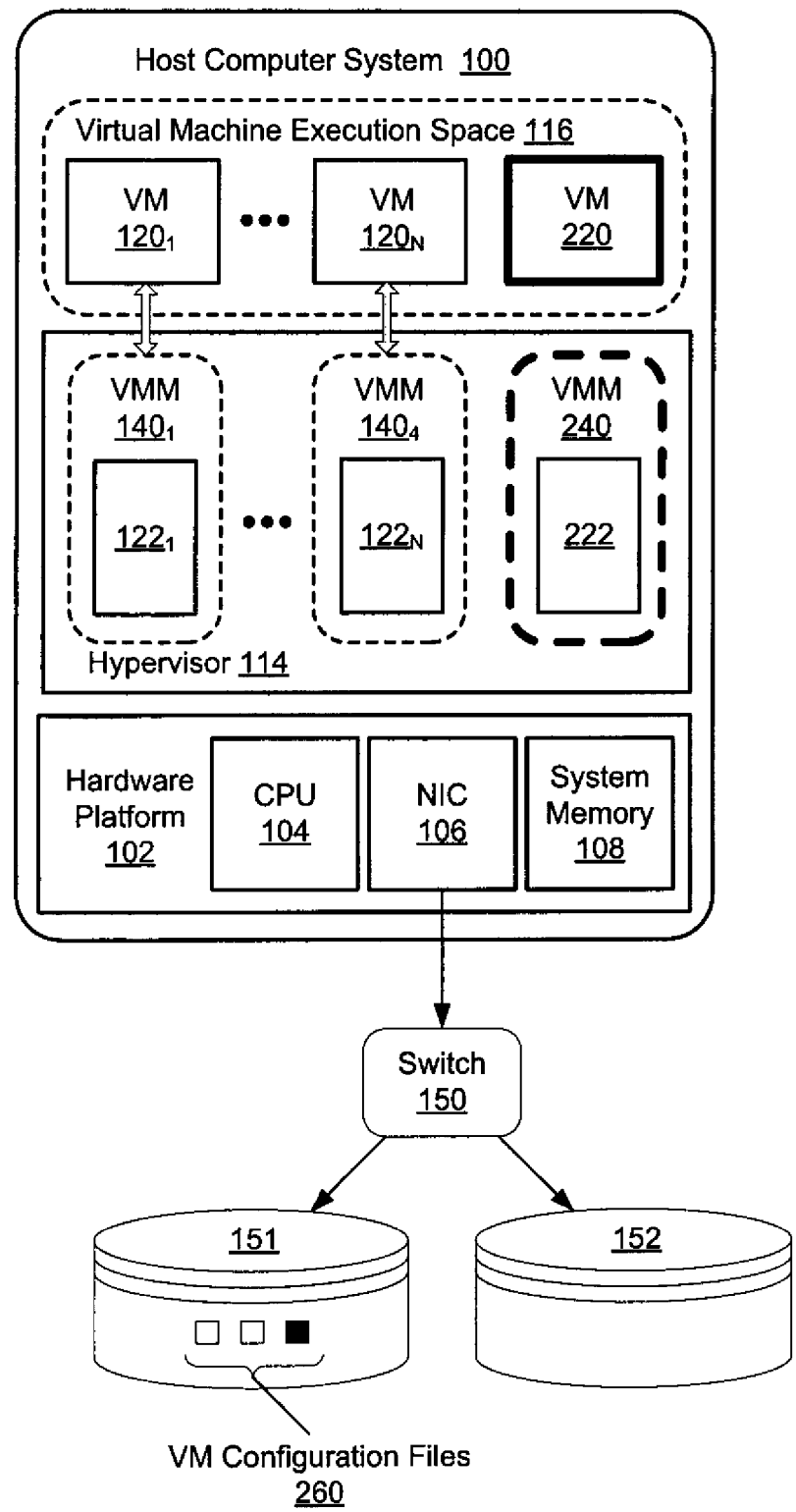
FIGS. 2, 3, 4 and 5 illustrate the methods of suspending and resuming and reconfiguring a virtual machine according to one or more embodiments of the invention.

First, a new VM process is started while the original VM process is still running. In FIG. 2, the original VM process is running as VM $120_1$ and the new VM process is running as VM 220. Hypervisor 114 manages virtual hardware platform 222 that includes emulated hardware such as virtual hard drive, virtual NIC, virtual CPU and guest physical RAM for VM 220, and VMM 240 implements the virtual system support needed to coordinate operations between hypervisor 114 and VM 220. In addition, hypervisor 114 allocates a virtual memory address space to VM 220 and maintains metadata about pages within this virtual memory address space. The metadata indicates whether a page within this virtual memory address space is mapped to a location in system memory 108, is shared with other virtual machine processes, has been swapped out to a swap device, has been ballooned (i.e., allocated for use by host computer system 100), etc. Each of VM $120_1$ and VM 220 has a corresponding VM configuration file 260 stored in storage array 151. The configuration file corresponding to the new VM process, VM 220, is distinguished from the others by being illustrated as a solid black square. Any desired configuration changes to the virtual machine should be reflected in this new configuration file. In FIG. 2, the block arrow connecting the VM with its VMM indicates that the VM is executing guest instructions. VM 220 and VMM 240 are not connected by such an arrow. This means that the VM 220 has been instantiated but is not yet executing guest instructions.

Figure 3:
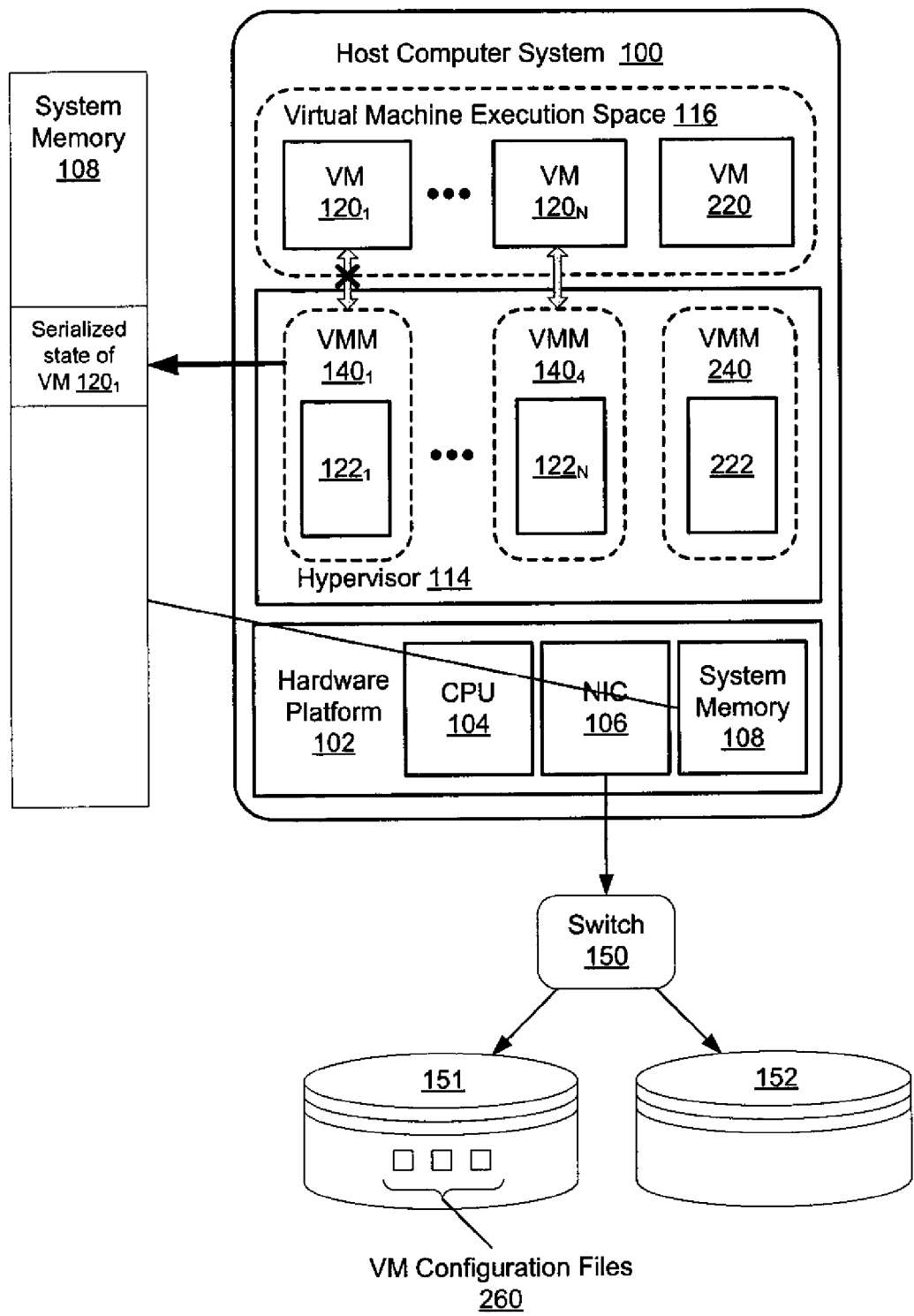

Second, the original VM process, VM $120_1$ is suspended. Referring to FIG. 3, when VM $120_1$ is suspended, hypervisor 114 halts the execution of guest instructions in VM $120_1$, as indicated by an "X" mark overlaying the block arrow connecting VM $120_1$ and VMM $140_1$, and serializes the current state of devices emulated for VM $120_1$, except for guest physical RAM. The serialized state is not written out to storage array 151 but is stored in system memory 108 and thus the slow, latency-prone storage reads and writes can be avoided.

Figure 4:
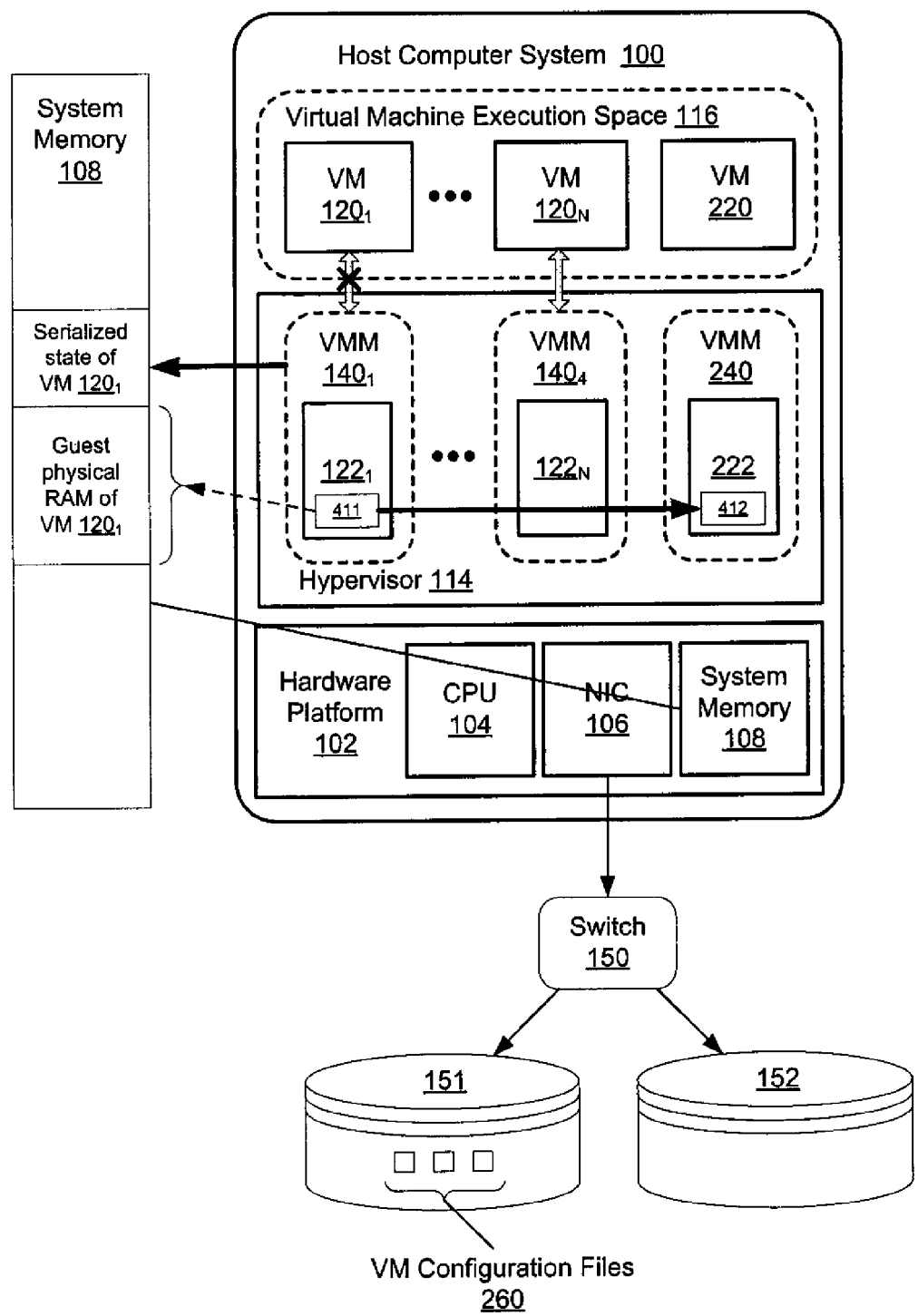

Third, for the guest physical RAM of VM $120_1$, instead of serializing and writing out its state to a file, the guest physical RAM of VM $120_1$ is "handed off" from VM $120_1$ to VM 220. This handoff is illustrated in FIG. 4 and entails copying the metadata 411 that hypervisor 114 is maintaining for virtual memory address space of VM $120_1$ (some of which include pointers to guest physical RAM of VM $120_1$) to be used as metadata 412 that hypervisor 114 is maintaining for the virtual memory address space of VM 220. This handoff can be achieved very quickly because it only deals with metadata which is orders of magnitude smaller than the actual data that the metadata represents. If one of the emulated devices for VM $120_1$ includes a video frame buffer, this can be handled in the same manner. Instead of serializing and writing out the state of emulated video frame buffer to a file, metadata that hypervisor 114 is maintaining for the video frame buffer of VM $120_1$ are copied and used as metadata that hypervisor 114 is maintaining for the video frame buffer of VM 220.

Figure 5:
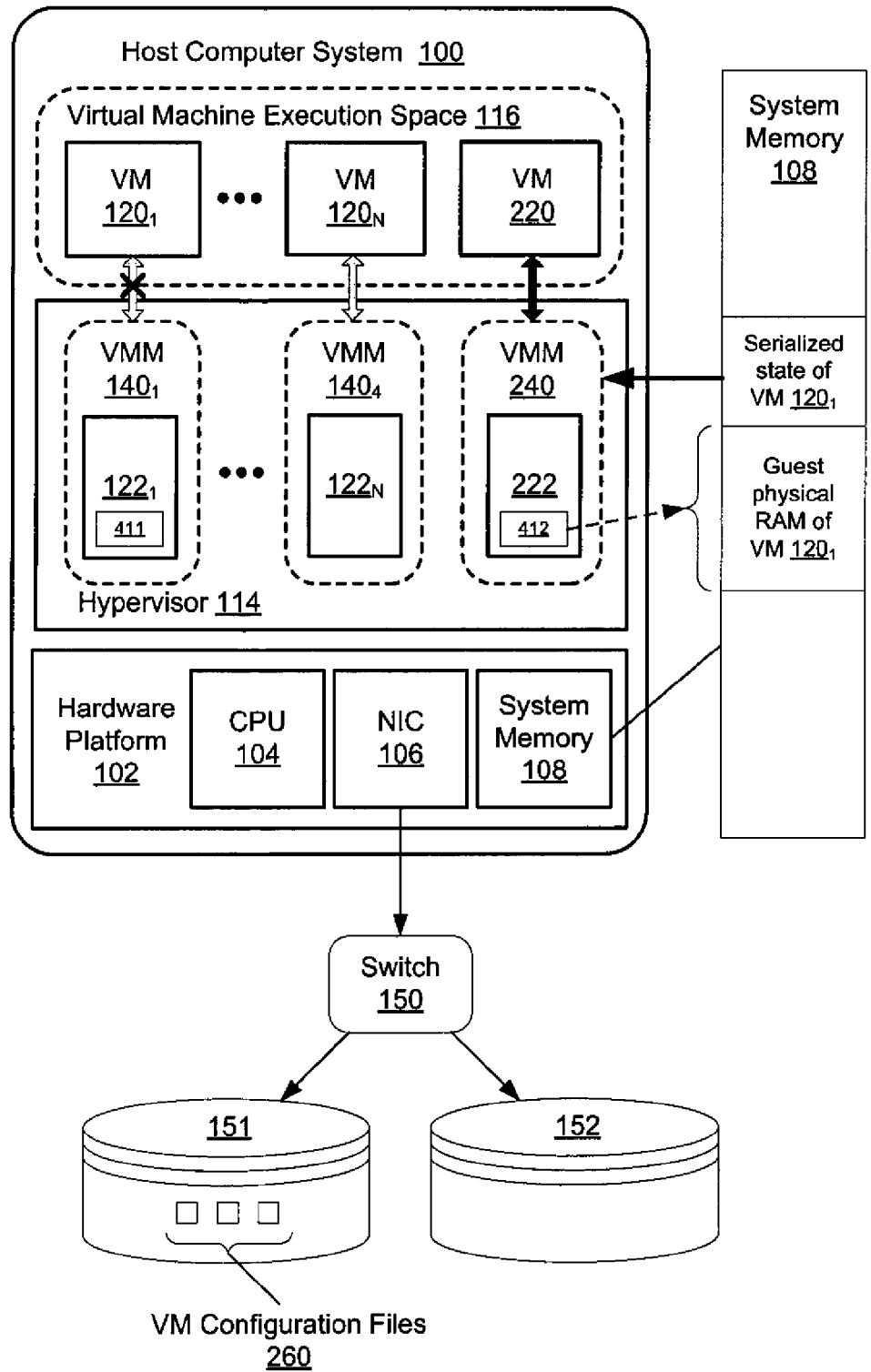

Fourth, the state of VM $120_1$ that is stored in system memory 108 is loaded into corresponding emulated devices of VM 220. This is illustrated in FIG. 5. Thereafter, VM 220, as reconfigured according to its VM configuration file 260, begins execution of the guest instructions and the reconfigured virtual machine is back up and running. This is illustrated in FIG. 5 by the block arrow connecting VM 220 and VMM 240. Once the reconfigured virtual machine is up and running, the original VM process then exits and frees any resources it was consuming.

The steps described above do not necessarily have to be performed in the order described. For example, the metadata copying step and the state loading step can be carried out in parallel or in the reverse order, based on performance considerations.

The advantages of the suspend/resume method described above, referred to as fast suspend and resume (FSR) below, are as follows:

No downtime or disruption to the VM. By optimizing the time consuming steps of a suspend/resume cycle, FSR is able to restart the VM fast enough (i.e. in the range of a couple of seconds or less) such that the VM's network connections are maintained and users and clients of the VM do not notice any outage.

Transparent to the guest OS and its applications. Because FSR uses the hypervisor's suspend and resume infrastructure, it is completely guest OS agnostic and transparent. The guest OS and applications in the VM have no idea that they are now running in a new VM process.

Low memory overhead. The memory overhead for the FSR operation will depend on the specifics of the hypervisor, but typically it is expected to be in the range of 5% or less of the VM's memory. Starting the new VM process while the old VM process is still running means some hypervisor overhead memory is being duplicated. In addition, the checkpoint data will require a few megabytes of memory. However, the VM's main memory is not duplicated, thus significantly reducing the cost of FSR is terms of memory.

Very low CPU overhead. The CPU cost of FSR is low due to the fact that very little data is moved/copied during the FSR and there are no complex calculations that need to be performed. The checkpoint process is fairly simple and straightforward—each virtual device just stuns itself and then writes out a few bytes of data. Because the VM's main memory is not copied, but "handed off," the normal CPU cost of copying VM's main memory is not present with FSR.

No network or storage requirements. FSR does not send any data over the network nor does it write anything to disk. Instead, it keeps a small data cache in memory for things like checkpoint data. This means that FSR essentially has zero cost from the networking and storage perspective.

No setup required. No user setup is required for the hypervisor or the VM to use FSR so long as the hypervisor has the FSR technology built into it.

Allows transparent reload of certain VM configuration data. FSR allows transparent reload of certain VM configuration data so that a VM can be updated while running in ways the source code of the hypervisor may have not intended. This allows for rapid creation of new features without too much new code, by facilitating a quick reload of VM configuration data rather than rewriting many parts of the hypervisor to support this type of dynamic change.

The suspend/resume method described above is generally applicable to a wide variety of problems and applications. FIGS. 6A and 6B, 7A and 7B, and 8A and 8B illustrate three applications of the suspend/resume method described above.

It should be understood that these applications are for example only and not meant to constrain the possible range of applications for the method.

Figure 6A:
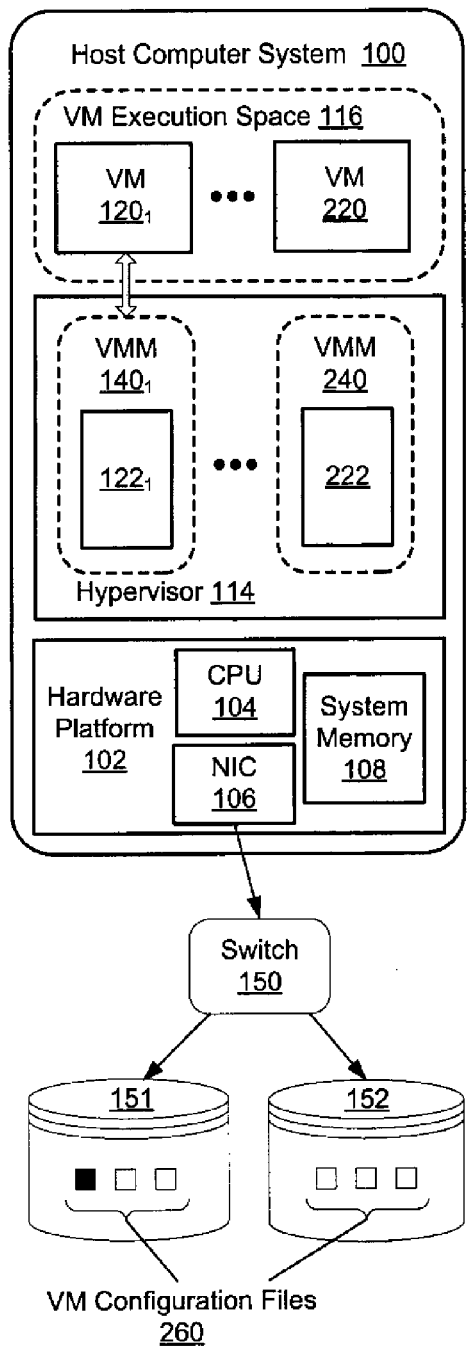
FIGS. 6A and 6B illustrate one application of the suspend/resume method according to an embodiment of the invention.
Figure 6B:
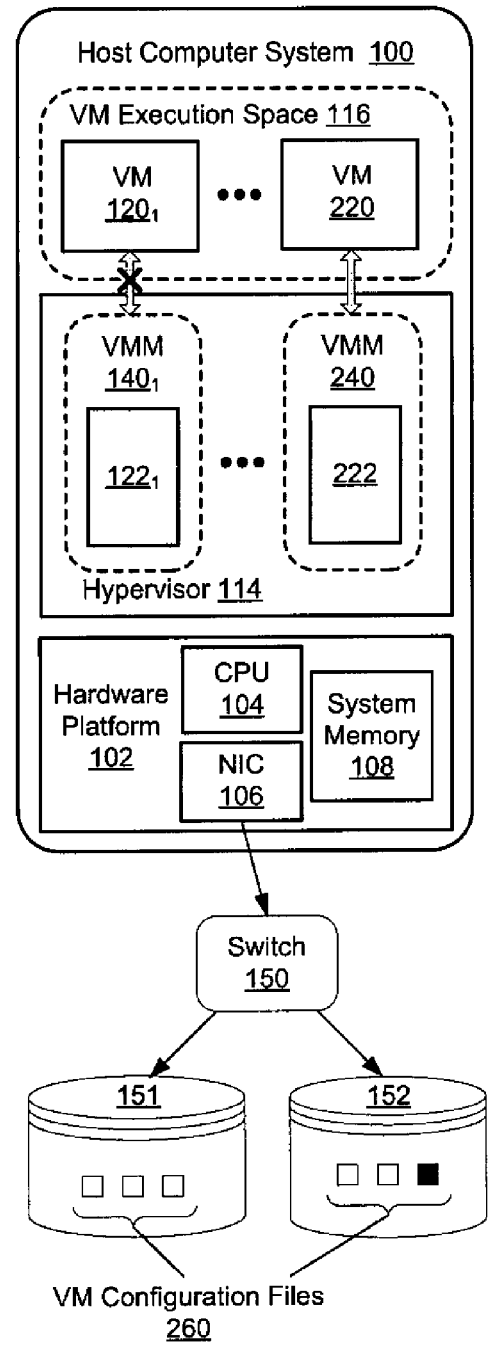

A product from VMware, Inc. known as Storage VMotion™, allows a running VM to change its storage backing without any downtime or disruption. As part of the storage relocation, many of the VM files in use by the hypervisor, e.g., the VM's configuration file, need to be moved to a new storage array. The movement of such files may be achieved using the suspend/resume method according to embodiments of the invention as illustrated in FIGS. 6A and 6B. FIG. 6A illustrates the original VM process, VM $120_1$, executing guest instructions prior to movement of the VM files to the new storage array. At the start of the process, the original VM process, VM $120_1$, whose configuration file is stored in storage array 151 (as indicated by a solid black square within storage array 151 in FIG. 6A) is suspended and its state stored in the manner described above. Then, a new VM process, VM 220, is spawned in such a manner that its configuration file resides in the new storage array, storage array 152. FIG. 6B shows the configuration file associated with VM 220 as a solid black square within storage array 152. This is followed by the movement of the VM files to the new storage array using Storage VMotion™, copying of the hypervisor metadata, and loading the stored state into VM 220. The VM execution is then resumed from the stored state with VM 220, as indicated by the block arrow connecting VM 220 and VMM 240 in FIG. 6B.

Figure 7A:
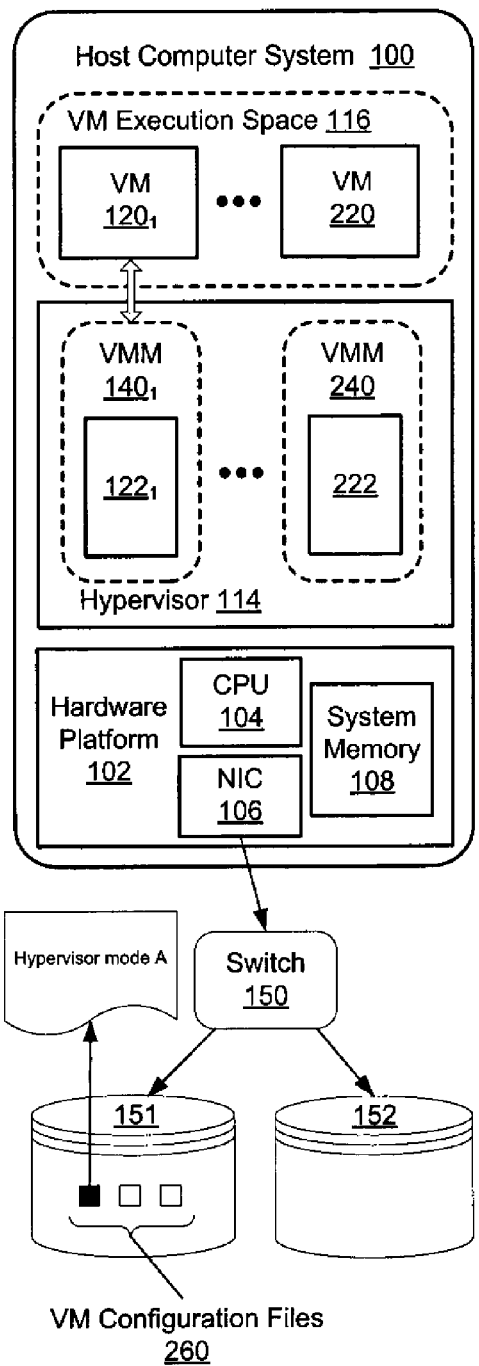
FIGS. 7A and 7B illustrate another application of the suspend/resume method according to an embodiment of the invention.
Figure 7B:
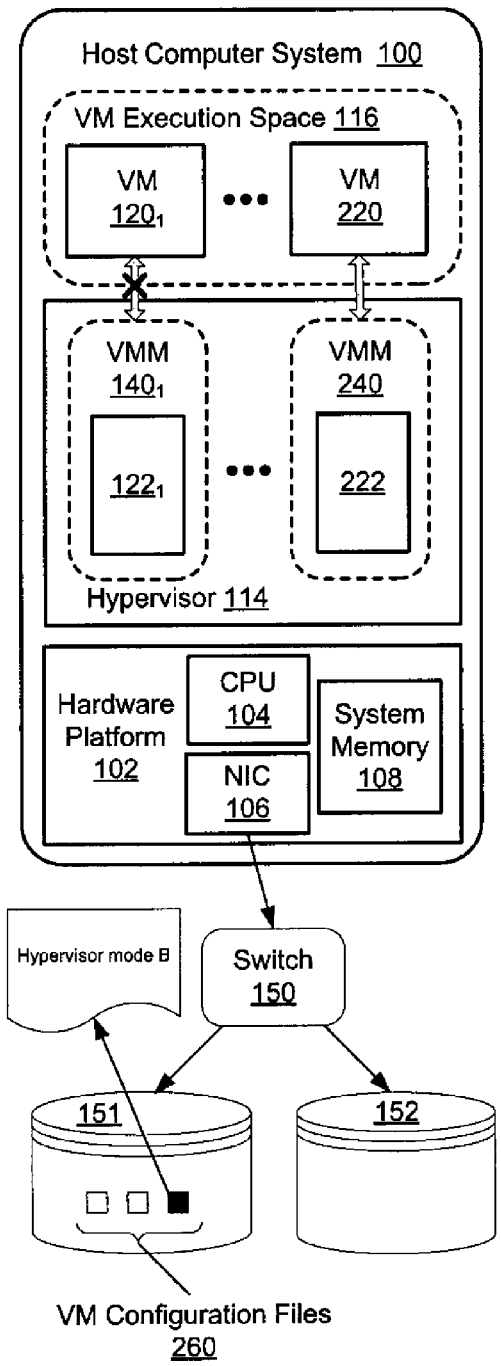

The suspend/resume method according to embodiments of the invention also enables hypervisor mode changing without downtime or disruption to the VM. Hypervisor mode changing may be required in applications such as VMware's Fault Tolerance, which is a high-availability feature that uses a special hypervisor mode to replicate a VM's state to a "secondary" VM on another host computer system in real-time, thereby allowing the VM to stay online and running in case of a physical host failure. The problem with using this feature has been that VMs could start in any number of different hypervisor modes, and a VM cannot change its hypervisor mode to the special hypervisor mode needed for fault tolerance while it is powered on. This meant that if a user wanted to enable fault tolerance for a VM, the user had to power cycle the VM, defeating the point of fault tolerance, which is to keep the VM available. By using the suspend/resume method according to embodiments of the invention, the user can reconfigure the VM to have the correct hypervisor mode for fault tolerance without VM downtime or disruption. FIGS. 7A and 7B illustrate the change in the hypervisor mode from A to B by showing the associated settings in the VM configuration files 260, where B is the special hypervisor mode needed for fault tolerance.

Figure 8A:
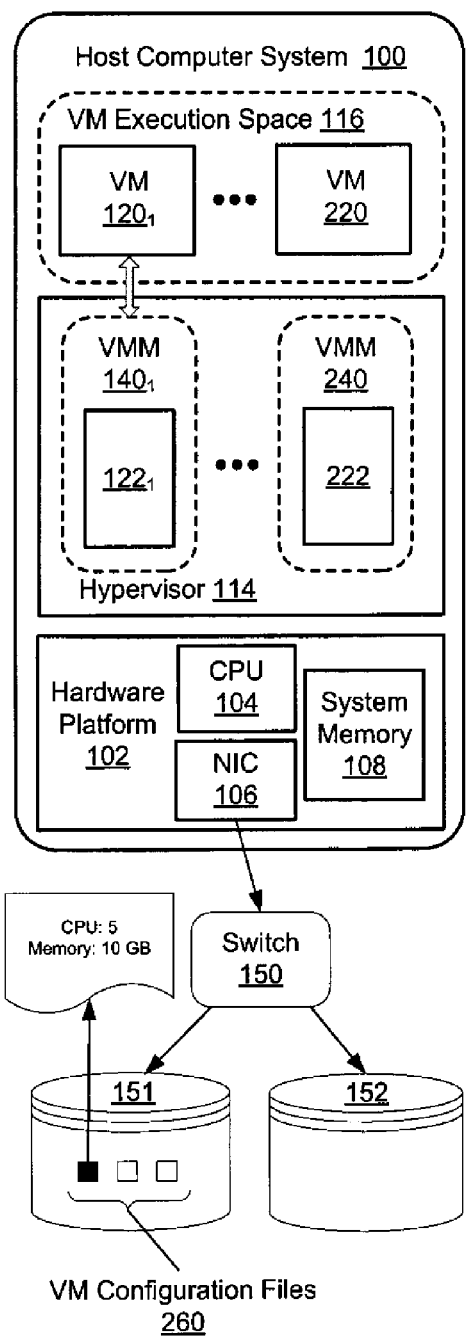
FIGS. 8A and 8B illustrate a third application of the suspend/resume method according to an embodiment of the invention.
Figure 8B:
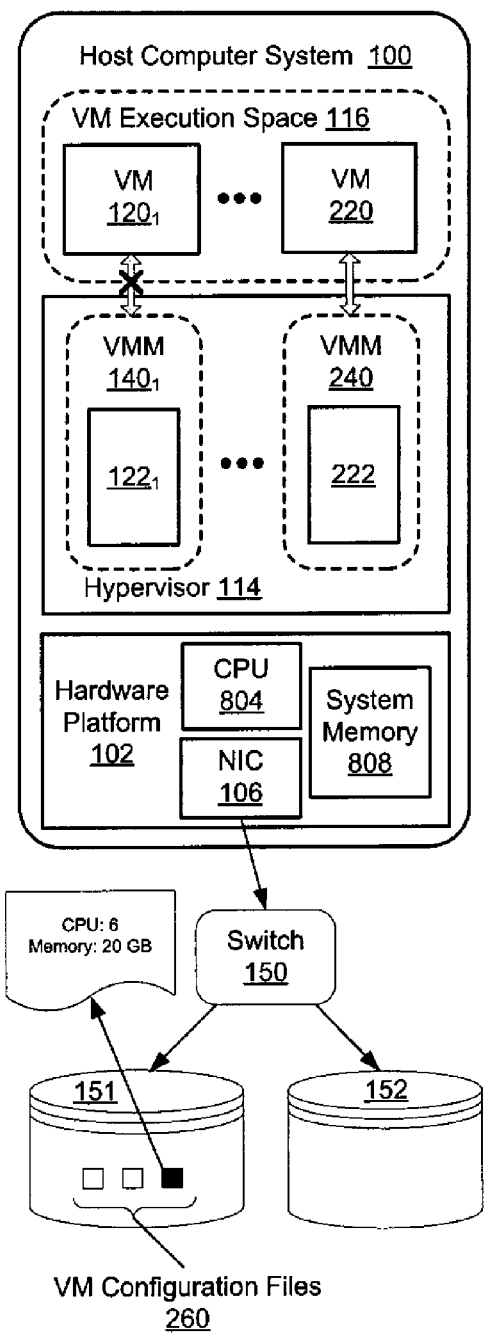

Another application of the suspend/resume method according to embodiments of the invention is to VMware's hotplug technology. VMware's hotplug technology allows a user to add CPUs, memory, or other devices to a running VM so that the running VM can take advantage of this additional virtual hardware. The hypervisor, however, does not support this type of activity, and so the suspend/resume method according to embodiments of the invention is used to update the VM's configuration file to specify the additional virtual hardware. FIGS. 8A and 8B illustrate the update to the VM's configuration file to specify the additional virtual hardware. In FIG. 8A, the original VM, VM $120_1$, is supported by five CPUs and 10 GB of system memory as specified in its configuration file. In FIG. 8B, the reconfigured VM, VM 220, is supported by six CPUs and 20 GB of system memory as specified in its configuration file.

Figure 9:
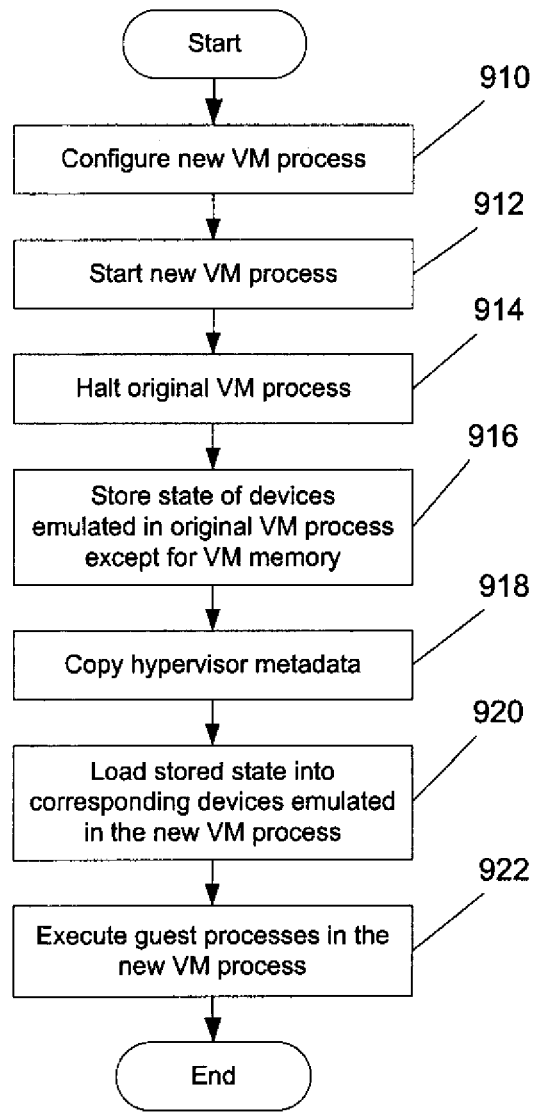
FIG. 9 is a flow diagram that illustrates the method of reconfiguring a virtual machine according to an embodiment of the invention.

FIG. 9 is a flow diagram that illustrates the method of reconfiguring a virtual machine according to an embodiment of the invention. In the embodiment illustrated herein, these steps are carried out within host computer system 100 by hypervisor 114. First, in steps 910 and 912, hypervisor 114 configures and starts a new VM process, e.g., VM 220 in FIG. 2. Then, the original VM process, e.g., VM $120_1$ in FIG. 3, is halted (step 914). Following the halting of the original VM process, the state of devices emulated in the original VM process, except for that VM's memory, is serialized and stored (step 916). Then, in step 918, metadata that hypervisor 114 is maintaining for pages of virtual memory space allocated for the original VM process are copied and used as metadata for pages of virtual memory space allocated for the new VM process. In step 920, the state of emulated devices stored in step 916 is read out, deserialized and loaded into corresponding devices emulated in the new VM process. The new VM process resumes the execution of the guest instructions in step 922. In alternative embodiments of the invention, steps 918 and 920 can be carried out in the reverse order.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. In a host computer having a virtual machine running therein to execute one or more guest instructions, a method of suspending a first instance of the virtual machine and the execution of the guest instructions in the first instance of the virtual machine and resuming the execution of the guest instructions in a second instance of the virtual machine, comprising the steps of:
   (a) instantiating the second instance of the virtual machine in said host computer while the guest instructions are being executed in the first instance of the virtual machine that is instantiated in said host computer;
   (b) suspending the execution of the guest instructions in the first instance of the virtual machine;
   (c) storing a state of the first instance of the virtual machine after step (b);
   (d) copying metadata maintained for pages of virtual memory space allocated for the first instance of the virtual machine and using the copied metadata as metadata for pages of virtual memory space allocated for the second instance of the virtual machine;
   (e) loading the stored state into the second instance of the virtual machine; and
   (f) resuming the execution of the guest instructions in the second instance of the virtual machine after steps (d) and (e), wherein the first instance of the virtual machine includes an emulated memory, and the stored state does not include a state of the emulated memory.

2. The method according to claim 1, wherein the first instance of the virtual machine includes a plurality of emulated devices further including an emulated CPU, emulated I/O devices, and an emulated hard disk.

3. The method according to claim 2, wherein the step (c) of storing includes serializing the state of the emulated CPU, emulated I/O devices, and emulated hard disk.

4. The method according to claim 1, wherein the state of the first instance of the virtual machine is stored in RAM.

5. The method according to claim 1, wherein the first instance of the virtual machine and the second instance of the virtual machine have different configurations of the virtual machine.

6. The method according to claim 5, further comprising the step of configuring the second instance of the virtual machine prior to step (a).

7. The method according to claim 5, wherein the first instance of the virtual machine is configured to operate in a first hypervisor mode and the second instance of the virtual machine is configured to operate in a second hypervisor mode that is different from the first hypervisor mode.

8. The method according to claim 5, wherein the second instance of the virtual machine is configured with additional hardware resources than the first instance of the virtual machine.

9. The method according to claim 1, wherein the first instance of the virtual machine has a configuration file and a virtual disk stored in a first storage array and the second instance of the virtual machine has a configuration file and a virtual disk stored in a second storage array that is physically different from the first storage array.

10. The method according to claim 1, wherein the guest instructions rely on network connections and a time period between steps (b) and (f) is sufficiently short so that the network connections are maintained between steps (b) and (f).

11. A method of reconfiguring a virtual machine running in a host computer, the virtual machine having a guest operating system and one or more guest instructions running therein, comprising the steps of:
suspending a first virtual machine process in which the guest operating system and the guest instructions are running;
storing a state of devices emulated in the first virtual machine process after the step of suspending;
copying metadata maintained for pages of virtual memory space allocated for the first virtual machine process and using the copied metadata as metadata for pages of virtual memory space allocated for a second virtual machine process that is configured differently from the first virtual machine process, the second virtual machine process running in said host computer;
loading the stored state into corresponding devices emulated in the second virtual machine process; and
executing the guest operating system and the guest instructions in the second virtual machine process,
wherein the first virtual machine process includes an emulated memory, and the stored state does not include a state of the emulated memory.

12. The method according to claim 11, wherein the second virtual machine process is spawned before the first virtual machine process is suspended.

13. The method according to claim 11, wherein the emulated devices for which the state is stored include an emulated CPU, emulated I/O devices, and an emulated hard disk.

14. The method according to claim 11, wherein the state is stored in RAM.

15. The method according to claim 11, wherein the virtual machine is instantiated by the first virtual machine process prior to the step of suspending and by the second virtual machine process after the step of loading.

16. A non-transitory computer-readable storage medium comprising instructions that are executable by a host computer having a first instance of a virtual machine running therein, wherein the instructions when executed by the host computer cause the host computer to carry out the steps of:
(a) instantiating a second instance of the virtual machine in said host computer while one or more guest instructions are being executed in the first instance of the virtual machine that is instantiated in said host computer;
(b) suspending the execution of the guest instructions in the first instance of the virtual machine;
(c) storing a state of the first instance of the virtual machine after step (b);
(d) copying metadata maintained for pages of virtual memory space allocated for the first instance of the virtual machine and using the copied metadata as metadata for pages of virtual memory space allocated for the second instance of the virtual machine;
(e) loading the stored state into the second instance of the virtual machine; and
(f) resuming the execution of the guest instructions in the second instance of the virtual machine after steps (d) and (e),
wherein the first instance of the virtual machine includes an emulated memory, and the stored state does not include a state of the emulated memory.

17. The non-transitory computer-readable storage medium according to claim 16, wherein the first instance of the virtual machine includes a plurality of emulated devices further including an emulated CPU, emulated I/O devices, and an emulated hard disk.

18. The non-transitory computer-readable storage medium according to claim 17, wherein the step (c) of storing includes serializing the state of the emulated CPU, emulated I/O devices, and emulated hard disk.

19. The non-transitory computer-readable storage medium according to claim 16, wherein the state of the first instance of the virtual machine is stored in RAM.

20. The non-transitory computer-readable storage medium according to claim 16, wherein the first instance of the virtual machine and the second instance of the virtual machine have different configurations.

* * * * *